Patented Sept. 25, 1945

2,385,377

UNITED STATES PATENT OFFICE 2,385,377

RESIN PLASTICIZER

Carl Opp, Cincinnati, Ohio, assignor to Interchemical Corporation, New York, N. Y., a corporation of Ohio No Drawing. Application July 28, 1943,
Serial No. 496,483

1 Claim. (Cl. 260—22)

This invention relates to a resinous plasticizer for cellulose organic esters such as cellulose acetate and cellulose aceto-propionate, and aims to provide a solvent plasticizer for this type of cellulose ester, characterized by exceptional flexibility and water-resistance, combined with good film strength.

As is well known to the art, there are relatively few solvent plasticizers for cellulose acetate, and the mixed ester obtained from cellulose with acetic acid and other lower fatty acids. It is particularly difficult to obtain an economical plasticizer from which high film strength films can be made. This is particularly true in the production of plasticizers for the manufacture of films which can be stripped from supports. In my copending application Serial Number 496,311, filed July 27, 1943 (and allowed Feb. 3, 1944, now Patent No. 2,357,221), I have disclosed a solvent plasticizer for cellulose acetate and the like films which produces films of exceptionally high film strength. As therein disclosed, this plasticizer comprises the reaction product of:

| | Per cent |
|---|---|
| Sebacic acid | 37.5 | with

| | |
|---|---|
| Succinic anhydride | 28.6 |
| Ethylene glycol | 19.3 |
| Glycerol | 14.6 |

Preferably the reaction is conducted at a relatively high temperature, of the order of 400° F., until after some hours an acid number of about 70 is obtained, which represents substantially completed reaction with the indicated proportions.

I have now discovered that this plasticizer can be modified to obtain a product which produces films of considerably higher moisture-proofness, adhesion and flexibility, while at the same time having greater film strength than that obtained with most plasticizers, by conducting the reaction in the presence of about 15 to 25% of castor oil, based upon the weight of ingredients present. Thus, my new reaction product would contain about

| | Parts by weight |
|---|---|
| Sebacic acid | 37.5 |
| Succinic anhydride | 28.6 |
| Ethylene glycol | 19.3 |
| Glycerol | 14.6 |
| Castor oil | 15-25 |

The reaction is conducted at a temperature of the order of 400° F. until an acid number of about 40 is obtained. Substantial variations, beyond 2 or 3% from the indicated proportions, markedly reduce the film strength of the resultant product.

A typical lacquer may be produced from this plasticizer over the following formula:

| | Parts by weight |
|---|---|
| Hercose AP (Cellulose aceto-propionate-low viscosity, 15% acetyl, 31% propionyl content) | 12.4 |
| Benzol | 27.9 |
| Methanol | 27.9 |
| Butyl acetate | 18.2 |
| Above-described resin | 3.5 |
| Tricresyl phosphate | 6.0 |
| Aroclor 1254 (diphenyl resin with 54% chlorine) | 3.5 |
| Carbitol citrate | 0.6 |

This is an excellent cable coating lacquer. The addition of the resin plasticizer to the composition produces a much higher film strength material than the same composition with other plasticizer used to replace it. Furthermore, the composition has improved adhesion, and improved resistance to moisture vapor.

It is obvious that the examples can be multiplied indefinitely without departing from the scope of the invention, which is defined in the claim.

I claim:

As a plasticizer for cellulose acetate, cellulose aceto propionate, and the like, the resinous reaction product of reactants consisting of approximately 37.5 parts by weight sebacic acid, 28.6 parts by weight succinic anhydride, 19.3 parts by weight ethylene glycol, 14.6 parts by weight glycerol, and 15-25 parts by weight castor oil.

CARL OPP.